June 22, 1948.  A. F. SIMONSON  2,443,872
ANIMAL RESTRAINING DEVICE
Filed Oct. 1, 1943
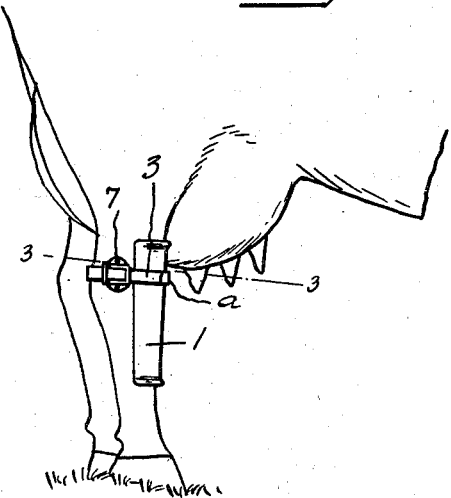
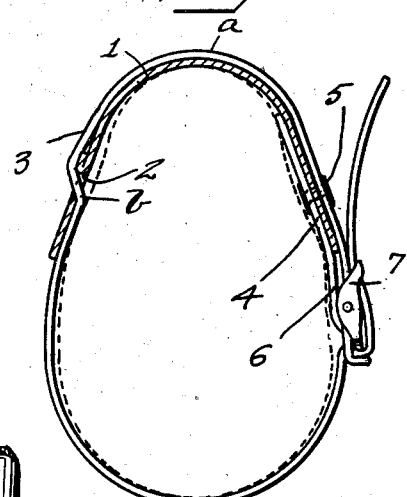
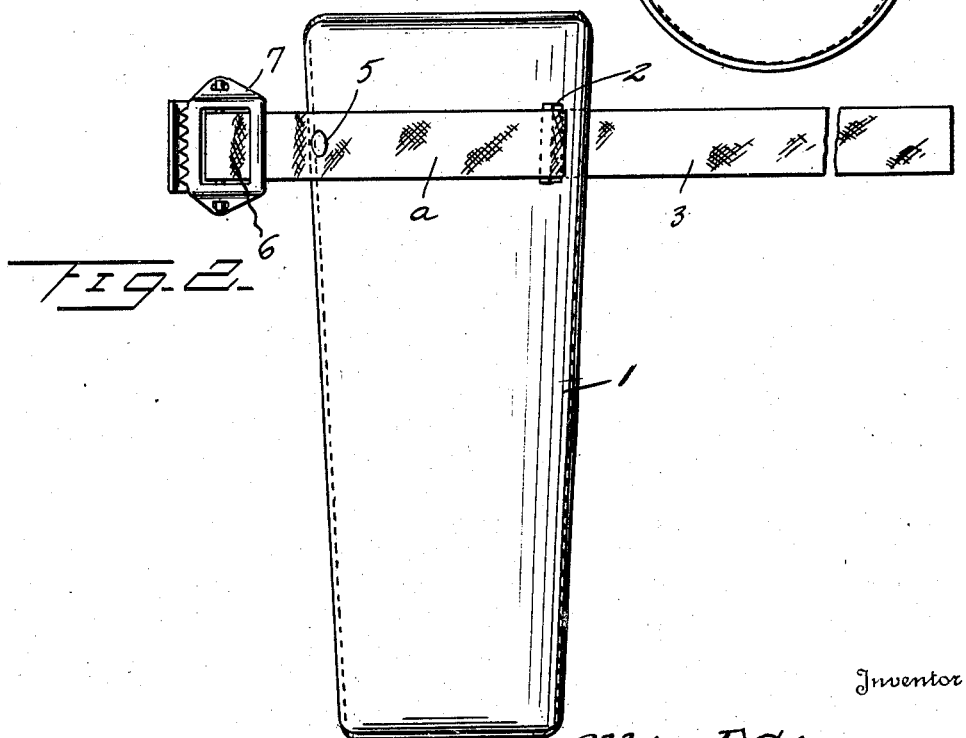
Inventor
Albin F. Simonson
By Wilfred Lawson
Attorney Patented June 22, 1948

2,443,872

UNITED STATES PATENT OFFICE 2,443,872

ANIMAL RESTRAINING DEVICE

Albin F. Simonson, Brookings, S. Dak.

Application October 1, 1943, Serial No. 504,626

1 Claim. (Cl. 119—127)

This invention relates to an animal restraining device, and it is a particular object of the invention to provide a device of this kind especially adapted to be applied to a hind leg of a cow to prevent kicking by the animal during a milking operation and wherein the device is constructed in a manner to substantially eliminate liability of injury to the animal by the device when in position.

A further object of the invention is to provide a device of this kind adapted to be applied to a hind leg of an animal in a manner to so bridge the joint as to prevent the kicking of such leg and wherein the device is held in applied position by a single attaching means of a type to engage the leg at a point above the joint and wherein said attaching means is of a character to provide a cushion for the protection of the animal.

The invention consists in the details of construction and in the combination and arrangement of the several parts of my improved animal restraining device whereby certain important advantages are attained, as will be hereinafter more fully set forth.

In order that my invention may be better understood, I will now proceed to describe the same with reference to the accompanying drawings, wherein:

Figure 1 is an elevational view showing a restraining device illustrating an embodiment of my invention in applied position;

Figure 2 is an enlarged front elevational view showing the strap or leg encircling member extended; and Figure 3 is a sectional view taken substantially on the line 3—3 of Figure 1, the associated leg of the animal being diagrammatically indicated by broken lines.

In the embodiment of the invention as illustrated in the accompanying drawings, the device comprises an elongated boot 1 of metal or such other material possessing the required rigidity. This boot from one end to the other is arcuate in cross section and the boot is of such dimensions as to substantially snugly straddle the forward portion of the hind leg of an animal and to bridge the joint of the leg. Due to the fact that the boot is formed of metal and is arcuate in cross section it will be apparent that it cannot be readily bent transversely and it will effectively prevent bending of the leg and make it impossible for the animal to kick. The device is particularly intended to be applied to the rear leg of a cow while being milked.

In order that the device may be engaged with the leg of the animal in the most effective manner and particularly to minimize liability of injury, the same gradually decreases in width from its upper end to its lower end.

The boot 1 in close proximity to a longitudinal margin thereof and also in close proximity to the top of the boot is provided with a slot 2 disposed in a general direction lengthwise of the boot. This slot 2 has freely threaded therethrough from without a strap 3 of desired material. This strap 3 has a portion a extending transversely across the upper portion of the boot with an extremity returned, as at 4, to extend inwardly of the boot 1 at the side thereof remote from the slot 2.

This returned extremity 4 is in direct contact with the inner face of the boot 1 and is held to the boot 1 by a rivet 5 or other desired fastening element which is disposed through the boot 1 and also through the strap or member 3, whereby the strap or member 3 is effectively anchored to the boot 1 by this sole connection. The returned extremity 4 of the strap 3 in coaction with the adjacent portion of the strap provides a loop 6 which extends beyond the adjacent longitudinal portion of the boot 1 and with which loop 6 is operatively engaged a buckle 7 of any desired type.

The strap 3, when the device is applied, overlies, as at b, the inner face of the boot 1 between slot 2 and the adjacent longitudinal margin of the boot and this portion b, together with the portion of the returned extremity 4 which overlies a part of the inner face of the boot at the opposite longitudinal margin, provide cushioning elements having direct contact with the leg of the animal to which the device is applied. Since the boot is not bendable transversely but is resilient enough to bend on a longitudinal line to be contracted, the cushioning elements materially minimize liability of injury to the leg of the animal as might otherwise occur by the tightening of the strap with the resultant contraction of the portion of the boot 1 around which the strap extends. It is believed to be readily apparent that the portion b and the returned extremity 4 of the strap will prevent the adjacent marginal edge of the boot from cutting into the flesh of the animal.

The strap 3 is of a length to extend across the rear portion of the leg of the animal to which the device is applied and to engage with the buckle 7.

It is to be pointed out that the device is of further particular advantage in view of the fact that only a single means of attachment to the leg is provided and with said means at the upper portion of the boot so as to be engaged with the leg of the animal above the joint.

From the foregoing description it is thought to be obvious that an animal restraining device constructed in accordance with my invention is particularly well adapted for use by reason of the convenience and facility with which it may be assembled and operated.

What is claimed is:

A restraining boot to be applied to the leg of an animal to prevent kicking, comprising a relatively long body of a material having a substantial degree of stiffness, such as metal, and having an arcuate cross section to fit over the leg of the animal to bridge the joint of such leg, the material being of sufficient flexibility to permit bending on a longitudinal line whereby it may be contracted across its width, the form of the body giving sufficient rigidity thereto to prevent transverse bending, the body adjacent to its top end and in close proximity to one longitudinal side edge being provided with a slot, a single securing strap for maintaining the boot in applied position, the strap extending transversely across the outer face of the body, one extremity of the strap being turned back across the opposite longitudinal edge of the body and disposed against the inner face thereof remote from the slot, means extending through the said turned back extremity of the strap, through the body and through the part of the strap lying against the outer face of the body to anchor the strap to the body, the strap extending from said anchoring means on the outer face of the body inwardly through the slot and passing across the inner face of the body between the slot and the adjacent longitudinal edge and being of a length to extend around the animal's leg, the turned back extremity of the strap and the adjacent portion providing a loop at the adjacent side edge of the body, a buckle carried by said loop, and the said turned back extremity of the strap and the portion lying between the slot and the adjacent body edge forming cushions for preventing the longitudinal edges of the body from cutting into the animal's leg upon possible contraction of the body resulting from the tightening of the strap around the animal's leg.

A. F. SIMONSON.

REFERENCES CITED

The following references are of record in the file of this patent:

UNITED STATES PATENTS

| Number | Name | Date |
|---|---|---|
| 765,354 | Boone | July 19, 1904 |
| 766,425 | Coleman | Aug. 2, 1904 |
| 934,651 | Ballard | Sept. 21, 1909 |
| 1,386,523 | Nelson | Aug. 2, 1921 |
| 1,509,574 | Wolfe | Sept. 23, 1924 |
| 1,624,861 | Dewey | Apr. 12, 1927 |
| 1,956,201 | Roberts | Apr. 24, 1934 |